July 26, 1955     I. I. TUBBS     2,713,713
SLITTING AND ASSEMBLING A RUBBER VALVE IN A CAN TOP
Original Filed May 2, 1949     5 Sheets-Sheet 1
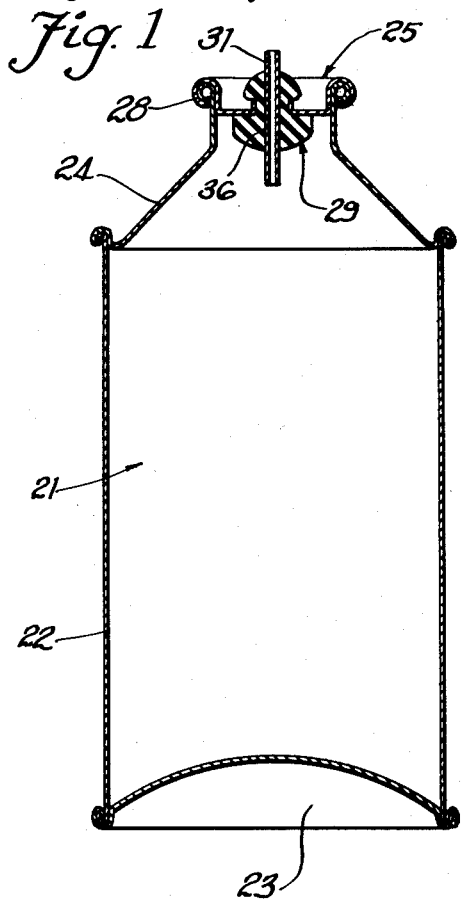
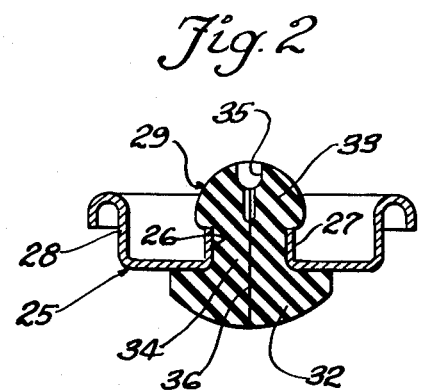
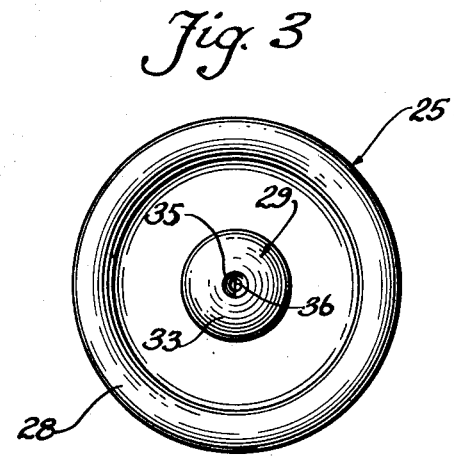
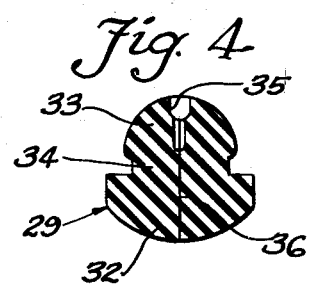
INVENTOR.
BY Irl I. Tubbs.
Sheridan, Davis and Cargill.
Attys July 26, 1955 I. I. TUBBS 2,713,713
SLITTING AND ASSEMBLING A RUBBER VALVE IN A CAN TOP
Original Filed May 2, 1949 5 Sheets-Sheet 2
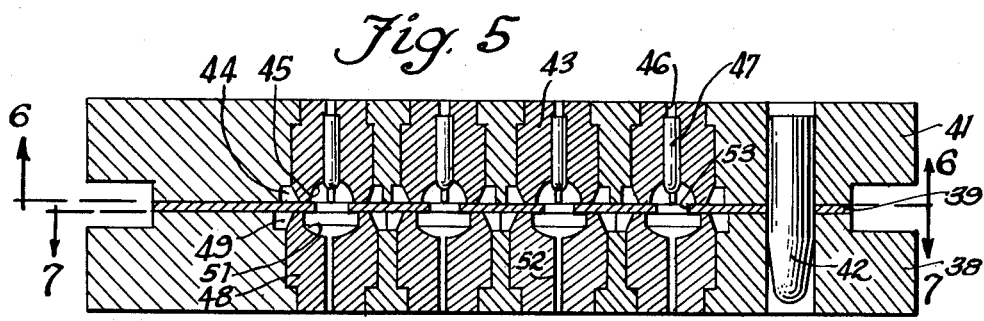
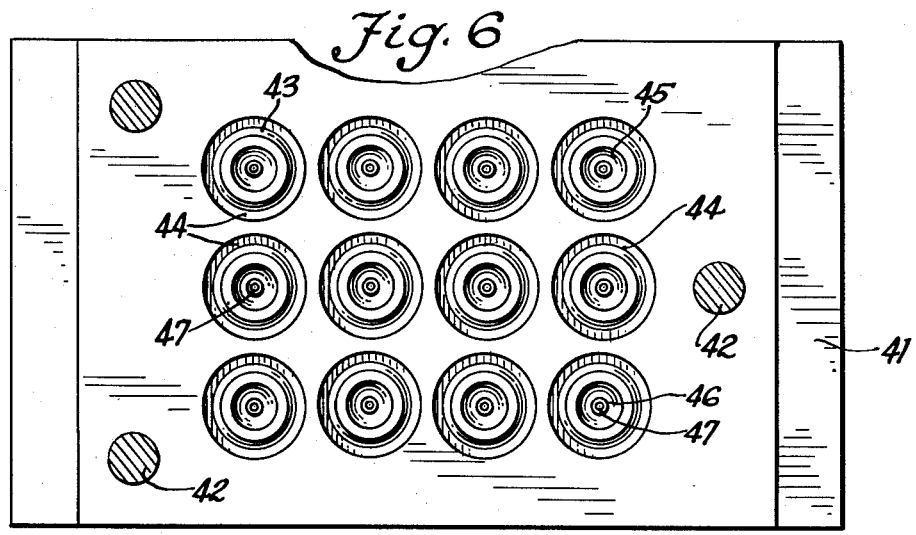
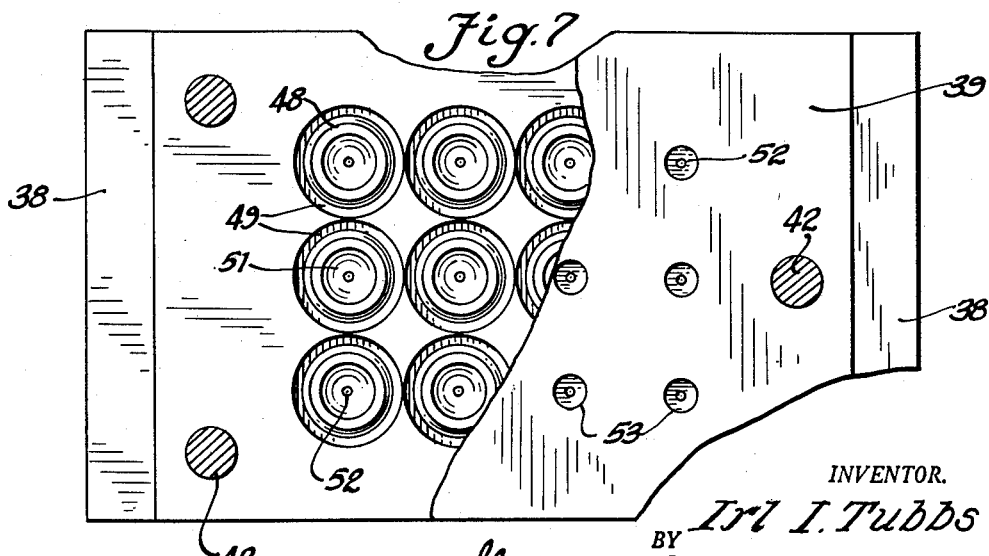
INVENTOR.
Irl I. Tubbs
BY Sheridan, Davis and Cargill
attys

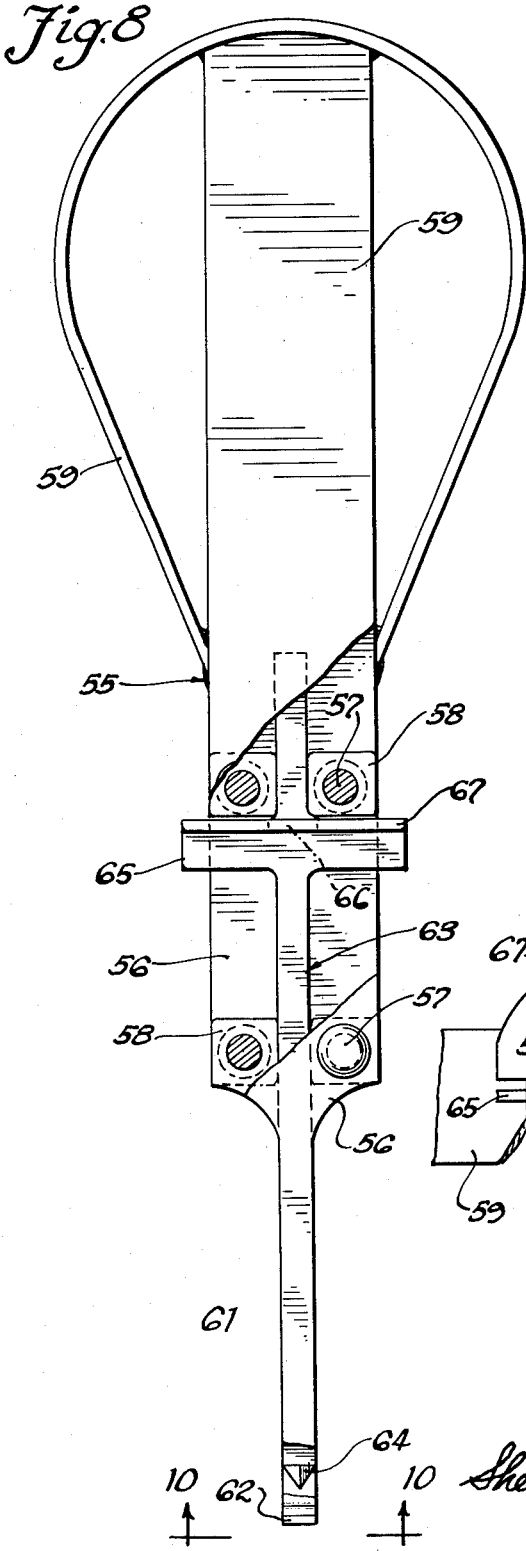
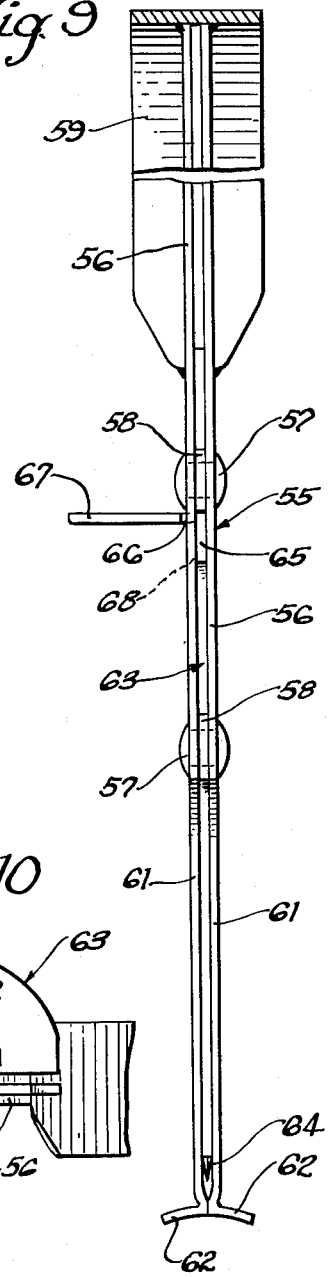
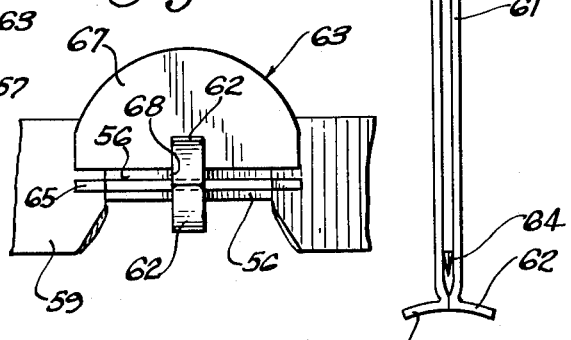

July 26, 1955     I. I. TUBBS     2,713,713
SLITTING AND ASSEMBLING A RUBBER VALVE IN A CAN TOP
Original Filed May 2, 1949     5 Sheets-Sheet 4

INVENTOR.
Irl I. Tubbs
BY Sheridan, Davis and Cargill
Attys

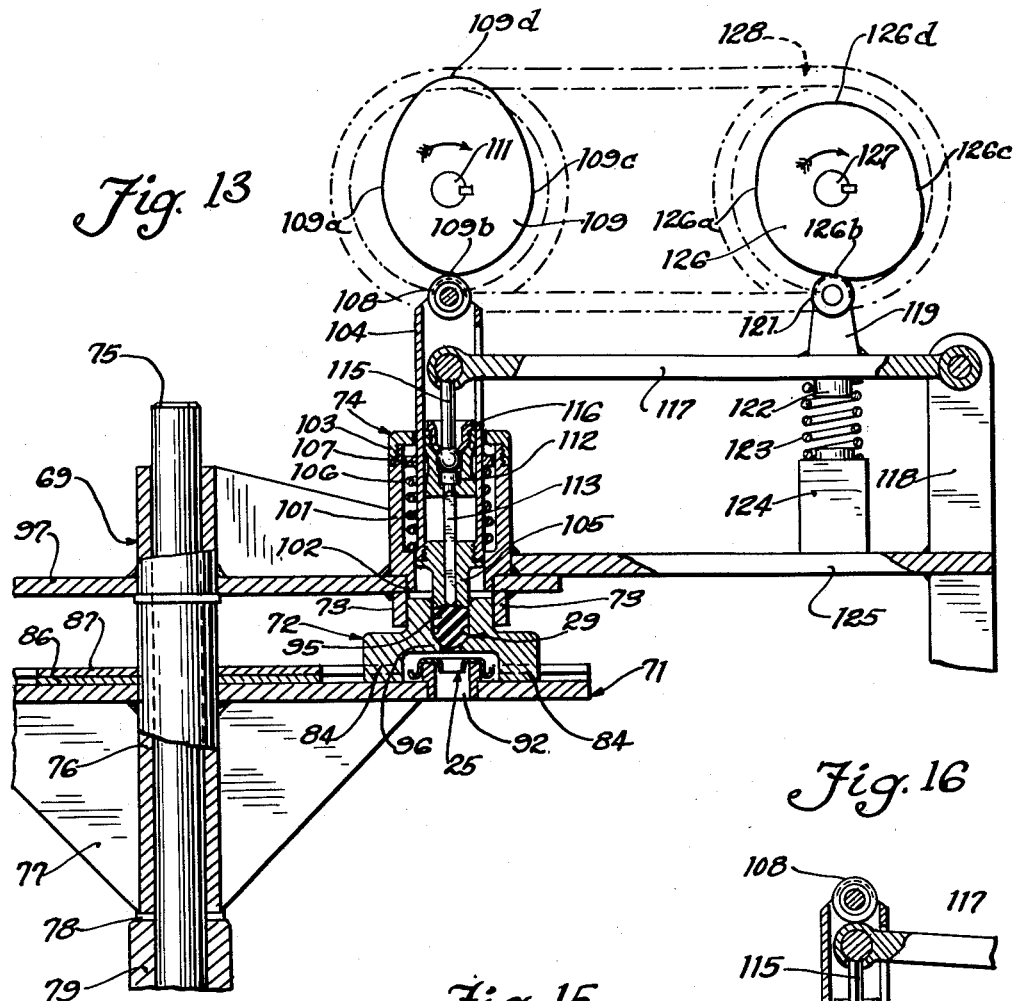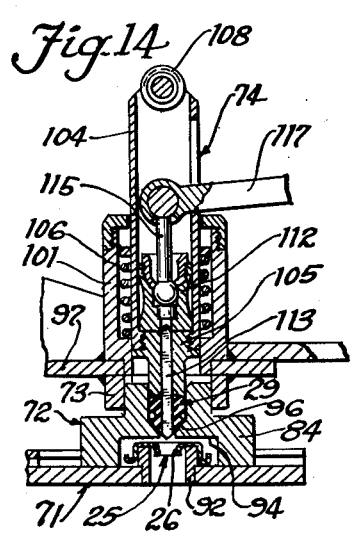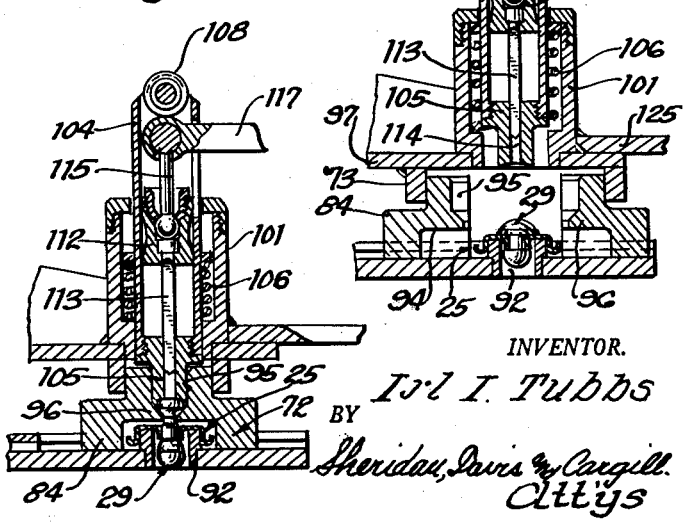

United States Patent Office 2,713,713
Patented July 26, 1955

2,713,713

SLITTING AND ASSEMBLING A RUBBER VALVE IN A CAN TOP

Irl I. Tubbs, Mount Vernon, Iowa

Original application May 2, 1949, Serial No. 90,898, now Patent No. 2,585,286, dated February 12, 1952. Divided and this application January 10, 1952, Serial No. 265,905

7 Claims. (Cl. 29—33)

This invention relates in general to valves, and more particularly to a method and apparatus for making the novel valve-containing closure member disclosed and claimed in my co-pending application Serial No. 90,898, filed May 2, 1949, and issued February 12, 1952, as United States Patent No. 2,585,286, the instant application being a division thereof.

The said parent application discloses a novel closure member for a container which effectively prevents leakage therefrom while permitting repeated insertions therethrough and withdrawals of a tubular needle or tool for filling or emptying the container of material which is under either positive or negative pressure.

Prior art structures for such uses have numerous disadvantages, including leakage after one or more insertions of the filling or emptying member, which have been found to be due to reliance upon the questionable capability of those portions of such rubber valves which are not subjected to some externally applied compressive forces to return to normal condition after having been stretched therefrom by the filling or emptying member.

An object of the present invention, therefore, is to eliminate the disadvantages of such structures by providing a relatively rigid closure member for the container having an apertured portion, and placing a rubber valve member, having a slit therethrough, in such aperture under compression so that the apertured portion retains an intermediate part of the valve under circumferential compression and axial tension; which permits insertion and withdrawal of a filling or emptying member or tool through the slit, and relies upon the inherent elasticity of the rubber, as augmented by such confining forces applied externally thereto by the relatively rigid member, to seal the aperture, to permit sufficient elastic deformation of the valve to enable insertion of the tool, and to cause the return of the valve to normal closed condition, upon withdrawal of the tool, to prevent any leakage through the slit. It is to be understood that the slit referred to preferably is cut in or through the valve member without removing any of the rubber therefrom, and is therefore normally closed, so that this member will function as a valve against relatively low pressures to prevent leakage through the slit without the assistance of any externally applied forces. For substantial pressures, however, it is necessary to retain a portion of such a valve under confining compressive forces commensurate with the pressures involved in order to maintain the slit closed. Also, the rubber must have sufficient elasticity to return the valve to normal condition upon withdrawal of the tool inserted through the slit. The elastic deformation of part of the valve resulting from insertion of a tool through the slit therein and its return to normal condition upon withdrawal of the tool will sometimes hereinafter be referred to as the "flow" of the rubber out of and back into the neck-like portion of the closure member. Such flow of the rubber confined under compression has been found to be extremely reliable and it effects a perfect seal at all times.

Another object of the invention is the provision of a novel method of making such a closure member, including particularly the combined steps of slitting a rubber valve member and inserting the same in a flanged aperture in the closure member.

A further object is to provide novel apparatus for making such a rubber valve member and for slitting and inserting the same in a rigid closure member.

Another object of the invention is the provision of a machine for accomplishing the slitting of such rubber valve members, and the insertion thereof in the apertures of such closure members, automatically in step-by-step sequence.

A further object is to provide a retaining member for a rubber valve in such a machine having a slightly smaller cross-sectional area than that of at least one of the end portions of the valve so as to retain the valve in proper position for slitting, and having an end portion of smaller cross-sectional area than that of the aperture in the closure member, so as to eliminate any strain against the latter as the valve is forced out of the retaining member and into the closure member and to elongate the valve sufficiently as it is passed therethrough to enable it to be properly positioned length-wise in the aperture of the closure member.

Numerous other objects and advantages of the invention will be apparent as it is better understood from the following description, which, when taken in connection with the accompanying drawings, discloses a preferred embodiment thereof.

In the drawings:

Figure 1 is a vertical sectional view of a container provided with a valve-containing closure member embodying the features of the instant invention, and showing a tubular tool inserted through the valve;

Fig. 2 is a sectional view similar to Fig. 1, on an enlarged scale, of the closure member with the rubber valve mounted therein;

Fig. 3 is a plan view of the valve-containing closure member of Fig. 2;

Fig. 4 is a vertical section, similar to Fig. 2, of the rubber valve in its normal condition prior to insertion in a closure member;

Fig. 5 is a vertical section through a compound mold for forming a plurality of the rubber valves;

Fig. 6 is a bottom plan view of the top plate of the mold of Fig. 5, with the guide pins shown in section;

Fig. 7 is a top plan view, similar to Fig. 6, of the lower plate of Fig. 5, showing part of the spacer plate at the right side thereof;

Fig. 8 is a plan view, with parts broken away, of a manual valve inserting and slitting tool;

Fig. 9 is a side elevation of the tool of Fig. 8, with a part of the handle thereof shown in section;

Fig. 10 is an end view, as seen from the line 10—10 of Fig. 8;

Fig. 13 is a vertical section taken substantially on the line 13—13 of Fig. 11, and showing a valve retained in initial operating position;

Fig. 14 is a view similar to Fig. 13 of the mechanism at the operation station in the position assumed immediately following slitting of a valve;

Fig. 15 is a view similar to Fig. 14, showing the position of the parts assumed immediately prior to the completion of the valve inserting step; and Fig. 16 is a view similar to Figs. 14 and 15, showing the slitting, inserting, and valve-containing mechanisms in their completely retracted positions, and a closure member following insertion of a valve therein.

Figure 11:
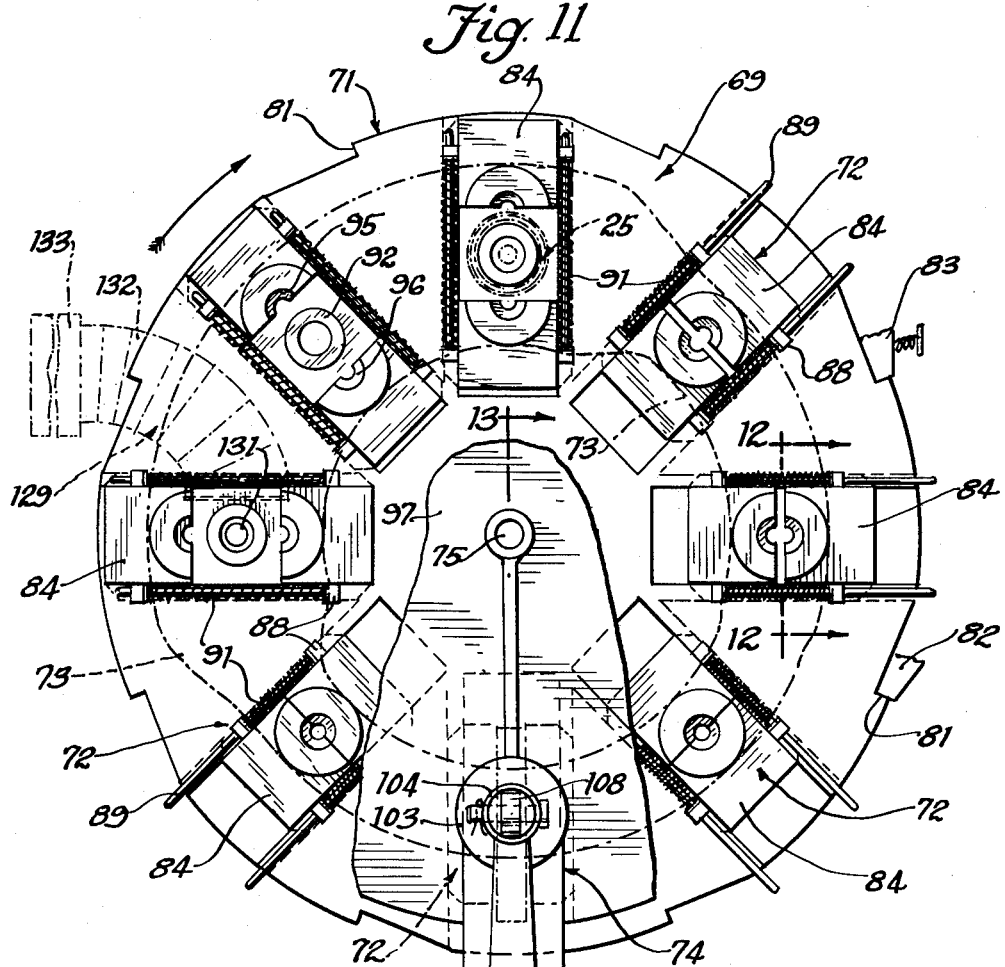
Fig. 11 is a top plan view, with part of the table broken away, of an automatic machine for slitting and inserting the valves in the closure members in step-by-step sequence.

Referring more particularly to Figs. 1 to 4, reference numeral 21 indicates in general a container adapted to retain dispensable material under pressure, which comprises a main body portion 22, a bottom end 23, and an open-ended top member 24 terminating at its upper end in a neck portion of well-known construction, shown in Fig. 1 as being sealed by means of a closure member embodying the features of the present invention, and designated generally by reference numeral 25. The main body 22 of this container 21 is provided at each end with the usual turned-back flanges cooperating with similar flanges on the outer edges of the bottom and top end members 23 and 24, in well-known manner, to provide the usual rolled flange attachment therebetween. This construction is that normally employed in beer cans or other similar disposable containers and, as in such prior art containers, the throat or neck of the top end member 24 terminates in the usual rolled-back flange.

The closure member 25 is relatively rigid in construction and preferably is formed as a sheet metal stamping. The central portion of this closure member is provided with an aperture 26 surrounded by a valve-retaining means in the form of an upstanding annular flange 27. A similarly disposed outer flange 28, having its upper edge reversely rolled in the manner best illustrated in Fig. 2, completes this closure member 25. After a rubber valve, indicated generally by reference numeral 29, has been mounted in the aperture 26 of the closure member 25, in a manner to be described in detail hereafter, this novel unit in its form of Figs. 2 and 3 is ready for attachment to the container 21 of Fig. 1.

As one example of the numerous possible uses of this novel closure member, it will be presumed that the container 21 is to be employed as a means for retaining cream and dispensing gas under pressure for periodic uses in the home, and adapted to be thrown away after having been emptied of such contents. For such use, the proper amount of cream is introduced into the container 21 through the open throat of the top end member 24 which, in the case of a pint container, comprises 6 or 7 liquid ounces of cream. With a standard gasket of rubber, or other suitable material, applied to either the rolled-back flange of the throat portion of the end 24, or the lower surface of the rolled-back portion of the flange 28 of the closure member 25, the latter is permanently secured to the container by well-known means in the manner illustrated in Fig. 1. It will be understood that such gasket means interposed between the top end member 24 and the closure member 25 may, if desired, be applied to these members by spraying during the previous manufacture thereof.

A filling tool 31 in the form of a tubular member or hollow needle is then inserted through the rubber valve 29, and a suitable gas, such as nitrous oxide or a combination of carbon dioxide therewith, is introduced under pressure through such tool to the interior of the container 21. In actual practice, a suitable pressure for such gas may be anywhere within the limits of 75 to 225 pounds per square inch, it being understood that these limits and the dispensing and dispensable materials herein described are merely illustrative of one possible use to which the instant invention may be put. Following such introduction of the dispensing gas under pressure to the container 21, the tool 31 is removed or withdrawn from the valve 29, and the latter provides a perfect seal to prevent leakage through the aperture 26 of the closure member 25, for reasons which will be more fully set forth hereinafter. The container 21 is then ready for the ultimate consumer, who may obtain desired quantities of whipped cream therefrom by inserting a suitable dispensing member, similar in the construction of its lower end to the tool 31, through the rubber valve 29 and, as will be more readily apparent after a reading of the following description of this valve member, an indefinite number of such insertions and withdrawals of the dispensing member may be effected without impairing the sealing function of the valve 29 or affecting its operation in any manner. Of course, this is just one possible use of the instant invention, and it will be understood that the container 21 may just as well be employed with other dispensable materials, as well as for vacuum or steam sterilization packing of any desired food or other products. Furthermore, it is within the concept of the instant invention that the closure member 25 is adapted for mounting in a suitable aperture in any desired portion of any suitable container, as in the bottom portion 23 of the instant container 21, for example.

Referring back to Figs. 2, 3 and 4, the rubber valve 29, which is shown in the latter figure in its normal shape prior to insertion in the closure member 25, comprises spaced inner and outer end portions 32 and 33 formed integrally with a central or intermediate portion 34. The diameter of this intermediate portion 34, as shown in Fig. 4, normally is slightly greater than the diameter of the aperture 26 in the closure member 25, and the length of this central portion 34 preferably is normally slightly less than the depth or vertical width of the flange 27 and, as also illustrated in Fig. 4, the outer diameter of at least one of the end portions 32 or 33 normally is greater than the diameter of the flange 27, the inner end portion 32 being herein illustrated as having a greater diameter than the outer end portion 33 merely to facilitate use of this valve with containers in which extremely high pressures are intended to be employed. It will be understood that it is not necessary that the outer end portion 33 have a greater normal diameter than the central portion 34. The outer end portion 33 preferably is provided with an axially disposed, tool-guiding aperture 35 formed therein in a manner to be later described, and a slit 36 extends completely through the valve member which is normally closed, and preferably of a width corresponding to the diameter of the larger outer portion of the aperture 35. This slit 36 is cut through the valve with a knife-like tool without removing any rubber from the valve, so that it is normally closed, as illustrated in Fig. 4, and will be maintained in such closed condition by the inherent elasticity of the rubber, without the application of any external forces to the valve. Consequently, in its unmounted condition of Fig. 4, the member 29 alone comprises a valve providing a normally closed passage therethrough in the form of the slit 36, which requires the application of a considerable pressure to its upper end through the aperture 35 to open the same when no tool or the like is employed for this purpose.

In the mounting of the valve 29 in the closure member 25, the outer end portion 33 is forced through the aperture 26 and the valve somewhat elongated axially to assume the position shown in Fig. 2. In this mounted position, it will be seen that the valve-retaining flange 27 maintains the central or intermediate portion 34 of the valve in circumferential compression, and also under some axial tension, by virtue of the relative dimensions of the different portions of the valve and the flange 27, as previously described. As also previously described herein, the inherent elasticity of the rubber of which the valve 29 is formed is sufficient to insure return of the valve to its normal closed condition of Fig. 2 upon withdrawal of the tool 31 therefrom, and it has been found that the retention of the central portion 34 under compression by the flange 27 will insure the maintenance of the slit 36 closed against extremely high pressures. In fact, it has been found that the valve-containing closure member 25, constructed as herein described and dimensioned as illustrated in Fig. 2, when placed in a suitable test head, will not leak and will withstand pressures in excess of 600 pounds per square inch.

Referring to Figs. 5, 6 and 7, the method and apparatus for making the rubber valve member 29, which comprises the present invention, will now be described. A multiple mold is therein illustrated which comprises a bottom plate 38, matching spacer plate 39 and upper plate 41, each of which is provided with multiple vertically aligned apertures for receiving suitable guide and retaining pins 42. The upper plate 41 has a plurality of identical counterbored recesses, herein shown as twelve (Fig. 6), each of which has an insert 43 press-fitted therein, and a marginal, annular clearance recess 44 concentric therewith and comprising an overflow cavity to receive excess rubber stock during molding. Each insert 43 is provided with a semispherical recess 45 centrally located in its lower end surface, and a stepped bore 46 extending axially therethrough for mounting a pin 47, as best seen in Fig. 5. Each of the recesses 45 defines the shape to be given to the outer end portion 33 of a valve 29, and the lower ends of the pins 47 are shaped as shown in Fig. 5 to function as a core to define the shape of the tool guiding recess 35 illustrated in Figs. 2 and 4. It will be understood that both the inserts 43 and these core pins 47 are press-fitted into their associated counterbored recesses, and the enlarged portions of the bores 46, respectively, and may readily be driven therefrom for purposes of replacement or repair by virtue of the reduced portions of the counterbored recesses and the bores 46 extending through the top surfaces of the plate 41 and the inserts 43, respectively. The bottom plate 38 is similarly provided with a plurality of identically spaced, counterbored recesses having inserts 48 press-fitted therein which are correspondingly placed with relation to the inserts 43, in the upper plate 41, each of which (as illustrated in Figs. 5 and 7) is surrounded by a concentrically disposed, annular clearance recess or overflow cavity 49. Each of these lower inserts 48 is provided with a semi-spherical recess 51 centrally located in its upper surface and a bleeder aperture 52 extending vertically therethrough in axial alignment with each of the core pins 47 when the upper and lower plates 41 and 38 are retained in molding position by the several guide pins 42. Interposed between the upper and lower plates, when the mold is so assembled, is the spacer plate 39 which, in addition to the guide apertures previously referred to for receiving the pins 42, is also provided with a plurality of apertures 53 axially aligned with the recesses 45 and 51. These apertures 53 define the central or intermediate portions 34 of the rubber valves 29. With such a mold, it will be seen that a plurality of rubber valves 29 of the configuration illustrated in Fig. 4 may be formed in a single molding operation in well-known manner.

It will be understood that the rubber valves 29 so molded will not incorporate the slits 36 previously described. The instant invention also contemplates a novel method and apparatus for slitting the valves 29 and mounting or inserting the same in the closure members 25 to provide the completed product illustrated in Fig. 2. A manually operable device for accomplishing these two steps of the complete method is illustrated in Figs. 8, 9 and 10. This slitting and inserting tool, which is indicated generally by reference numeral 55, comprises a pair of identical frame members 56 overlying each other and rigidly secured together intermediate their ends in spaced relation by means of a plurality of rivets 57, or the like, and spacer plates 58. One end of each of these frame members 56 also is secured by welding, or the like, to the ends and central portion of a vertically disposed, curved handle member 59. The opposite end of each of these frame members 56 is materially reduced in cross-section to provide an elongated pressure finger 61 terminating at its outer end in a curved flange or valve-engaging part 62. As is best seen in Figs. 9 and 10, the inner ends of these two flanges 62 normally contact each other, so that together the two flanges normally present a continuous, curved outer surface for exerting pressure against the end surface of the inner end portion 32 of a valve 29. By grasping the tool 55 by its handle 59 and so directing pressure longitudinally thereof, with the flanges 62 in engagement with the end portion 32 of a valve 29, while retaining a closure member 25 in proper alignment with such valve, either manually or by means of a suitable holding jig, the smaller, outer end portion 33 of the valve may be readily forced through the aperture 26 of the closure member until the valve assumes its mounted position therein, as shown in Fig. 2.

This tool 55 also is adapted to effect the previously described slitting of the valves 29. For this purpose it is provided with a knife element 63 slidably disposed between the frame members 56. The outer end portion of this knife element 63 has a configuration similar to that of the fingers 61 (Fig. 8), and it is sharpened at its end to provide a slitting point 64. The rear end of this knife element 63 has the same cross-sectional shape as this forward position, both of these parts of the element being guided for longitudinal movement and restrained against lateral movement relative to the fingers 61 by the spacer plates 58. The intermediate portion of the knife element 63 is enlarged laterally at 65 to limit its longitudinal movement relative to the rest of the tool 55 by contact with the inner edges of the spacer plates 58. Secured to the rear edge of this intermediate portion 65 is a narrow tongue 66 of a vertically disposed thumb piece 67, the lower edge of this piece 67 being disposed slightly above the upper surface of the top frame member 56, and the latter having a suitable longitudinal slot 68 (Figs. 9 and 10) therein to accommodate sliding movement of the tongue 66. With this arrangement, longitudinal pressure exerted against the thumb piece 67 will move the knife element 63 relative to the frame members 56 and, as will best be appreciated from Fig. 9, such outward movement of the knife element will cause its slitting point 64 to pass between and beyond the flanges 62. Retraction of the knife element 63 to its normal position, shown in the drawings, will result in these flanges 62 springing back together into their normal position, as best seen in Fig. 9, wherein the slitting point 64 is protected against contact with any outside object. Consequently, with an unslit valve 29 mounted in a closure member 25 (as shown in Fig. 2), the tool 55 may be placed in axial alignment therewith with the flanges 62 engaging the outer surface of the inner end portion 32, and when a sharp blow or force is quickly applied to the thumb piece 67, the slitting end 64 of the knife element 63 will be projected beyond the flanges 62 and through the valve 29 to form the desired slit 36 therein without removing any rubber from the valve. Upon subsequent withdrawal of the knife element from the valve to its retracted position of Fig. 9, the article of manufacture comprising the apertured closure member 25 and rubber valve 29 will be completed, as illustrated in Fig. 2.

The present invention also contemplates the provision of a machine for automatically accomplishing similar slitting of rubber valve members 29 and insertion thereof in closure members 25 in step-by-step sequence, which is illustrated in Figs. 11 to 16. This machine, which is indicated generally by reference numeral 69, comprises a rotatable table 71 having a plurality of mechanisms 72 mounted thereon for receiving and retaining in proper relationship to each other the closure members 25 and valve members 29, means for automatically rotating such table in step-by-step movements, means associated with each of such retaining mechanisms 72 for normally moving the same to an open or valve-receiving position, means for automatically loading the closure members 25 individually thereon, means for automatically loading the valve members 29 individually therein, means for automatically closing said valve-receiving mechanisms 72 in different degrees at different stages of operation of the rotatable table 71, shown herein as comprising stationary cam members 73, valve slitting and inserting mechanism, indicated generally by reference numeral 74, located at a final operation stage, and means for cyclically operating this mechanism 74 after each step-by-step movement of the table 71.

As best seen in Fig. 13, the table 71 is rotatably mounted on a centrally disposed, vertically extending, stationary supporting post 75 by any suitable bearing means, shown herein as comprising a sleeve 75 by any suitable bearing means, shown herein as comprising a sleeve 76 secured by welding to the table by bracing members 77, with a suitable thrust plate or bearing 78 interposed between the lower end of such sleeve and a lower support member 79. The marginal edge surface of this rotatable table 71 is provided with a plurality of equally spaced teeth 81 corresponding in number to the number of retaining mechanisms 72 and shown as eight in Fig. 11. Suitable means are provided for co-operating with these teeth 81 to impart sequential step-by-step increments of rotation to the table 71, which may take any desired form and are represented in Fig. 11 diagrammatically as comprising a pusher pawl 82 and a spring-urged locater or back-stop pawl 83 for preventing over-running of the table beyond its proper operating positions or stages.

The eight retaining mechanisms 72 are identical with each other, and each comprises a pair of jaw members 84 each having laterally extending base flanges 85 (Fig. 12) for guiding movement of the jaw members radially of the table 71 in cooperation with the substantially radially disposed side edges of spacer plates 86 rigidly secured to the table 71. Mounted on these spacer plates 86, and rigidly secured thereto in any suitable manner, are a plurality of guide plates 87, the inner edges of which are disposed parallel to the inner edges of the spacer plates 86, overlying the base flanges 85 of the jaw members 84. Each of these jaw members 84 also is provided on each lateral edge with an apertured ear or lug 88. A guide rod 89 extends slidably through each lug 88 of the outer jaw member 84 and is suitably secured within the aperture of the associated lug 88 of the inner jaw member 84. These rods 89 are horizontally disposed, and each has a coil spring 91 mounted thereon, the ends of these springs abutting against the opposed inner surfaces of the associated lugs 88.

Figure 12:
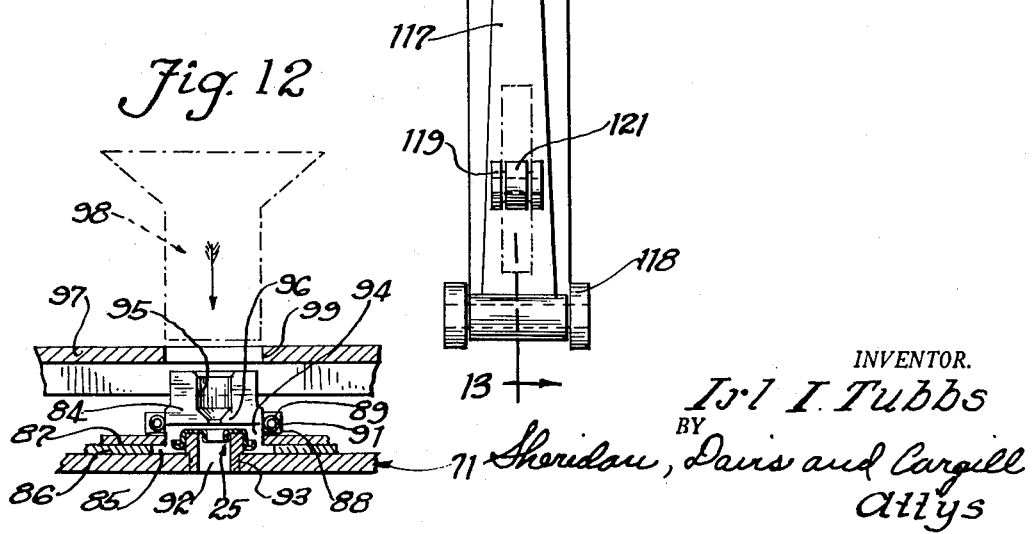
Fig. 12 is a detail vertical section taken substantially on the line 12—12 of Fig. 11.

Below each such pair of jaw members 84 is disposed a closure member receiving anvil 92 in the form of a sleeve mounted, as illustrated in Fig. 12, in a suitable aperture 93 provided in the table 71. As best seen in Fig. 16, the lower portion of each jaw member 84 is cut away at 94 to provide suitable clearance for the sleeve 92 and a closure member 25 mounted in inverted position thereon. The inner surface of the upper portion of each jaw member 84 is provided with a semi-cylindrical recess 95 (Fig. 12), the lower portion of which is decreased in diameter to provide a semi-conical space defined by an inwardly extending shoulder 96. Thus, when the opposed jaw members 84 are moved together into contacting relationship with each other against the action of the springs 91, the two recesses 95 form a cylindrical valve-receiving aperture which is reduced cross-sectionally at its lower end by the shoulders 96.

As best seen in Fig. 13, a stationary plate 97 is mounted in any suitable manner on the post 75 above, and in spaced relationship to, the table 71. The stationary cam members 73 previously referred to comprise depending flange members or ribs secured to the under surface of this stationary plate 97, as by welding. The opposed vertical surfaces of these spaced cam ribs 73 are slidably contacted by the outer end surfaces of the upper portions of the several jaw members 84. As is illustrated in Fig. 11 in broken lines, at different locations spaced circumferentially around the post 75 these cam ribs 73 are spaced from each other at any one of three different distances. Considering the table 71 as being divided into eight segmental portions, each having a pair of jaw members 84 mounted thereon, that in the lowermost position in Fig. 11 is disposed in what will hereinafter be referred to as the operating position or station. At this point, and extending in either direction therefrom for slightly more than one-eighth of the circumference of the table 71, the cam ribs 73 are in their closest relationship to each other. Throughout this portion of their length, these cam ribs thus maintain the jaw members 84 in fully closed position in contact with each other. From the left end of this position of the cam ribs 73 (as viewed in Fig. 11) they are spread apart from each other to their widest spacing, which permits the springs 91 to move the jaw members 84 away from each other to their fully opened positions. Such spacing of the cam ribs 73 continues in a clockwise direction (viewing Fig. 11) to a point slightly beyond the upper part of this figure, where they converge toward each other to an intermediate spacing which continues for slightly more than the following quarter of the stationary plate 97 to the point where they further converge to their closest spacing. Viewing Fig. 11, it will be appreciated that movement of the table 71 for the arcuate distance subtending adjacent teeth 81, in a clockwise direction, will cause that pair of jaw members 84 in the uppermost part of this figure to be moved toward each other by the cam ribs 73 against the action of their springs 91 from fully opened position to an intermediate or partially closed position. Such movement of the table 71 likewise will cause the cam members 73 to move that pair of jaw members 84 at the right-hand side of Fig. 11 from an intermediate to a fully closed position. From the above, it is thought that the sequential opening and closing of the jaw members 84 of each of the retaining mechanisms 72 throughout the eighth different positions or operating stations herein provided will now be fully understood.

It is contemplated that the uppermost position or station shown in Fig. 11, wherein the jaw members 84 of the retaining mechanism 72 therein disposed are fully opened, will constitute the loading position for the closure members 25, and the present invention includes the provision of any suitable automatic hopper-type loading mechanism, illustrated in Fig. 12 diagrammatically at 98, for individually dispensing a closure member 25 and dropping the same in inverted position onto the anvil 92 through a suitable aperture 99 in the plate 97. Subsequent clockwise movement of the table 71 through one-eighth of a complete rotation by the pusher pawl 82 will then close these jaw members 84 to their intermediate position, wherein their inner ends will overlie the closure member 25 so placed on the sleeve or anvil 92. The next similar incremental movement of the table 71 will bring this same receiving mechanism 72 to the third stage illustrated at the right-hand side of Fig. 11, where a similar automatic hopper-type loading mechanism 98 is mounted for individually feeding the unslit valves 29 in inverted position into the receiving aperture defined by the jaw recesses 95 through another aperture 99 in the plates 97 similar to that located at the first state. The next incremental movement of the table 71 will then cause the cam members 73 to completely close this pair of jaw members 84, which will squeeze the rubber valve 29 deposited therebetween slightly, because the aperture formed by the recesses 95 is a trifle smaller in diameter than that of the larger end portion 32 of the valve. The valve will then be held firmly in the position shown in Fig. 13 directly above, and in axial alignment with, the closure member 25 previously deposited on the associated anvil 92. This particular retaining mechanism 72 thereafter will be moved into the fifth or operating stage by the next operation of the pusher pawl 82.

Located at this operating stage or position, as best illustrated in Fig. 13, is the valve slitting and inserting mechanism 74 previously referred to. This mechanism comprises a hollow casing 101 reduced at its lower end to seat in a suitable aperture 102 extending through the horizontal, stationary plate 97, to which the casing is secured in any suitable manner. The upper end of the casing is externally threaded to receive an apertured cover 103 for guiding the upper portion of a sleeve 104 which is provided at its lower end with a valve-inserting plug 105. The bore of the casing 101 is reduced at its lower end to provide a guide or bearing portion for the lower end of the combined sleeve and plug 104, 105 and a shoulder on which the lower end of a coil spring 106 rests. The spring 106 is disposed between the sleeve 104 and the casing 101, and the upper end of this spring engages a flange 107 formed integrally with, or secured in any suitable manner to, the sleeve 104 intermediate the ends thereof. At its upper end, this sleeve 104 has a cam follower or roller 108 rotatably mounted thereon for engagement with the edge of a disk cam 109 secured to a horizontally disposed shaft 111 rotatably supported in any suitable manner.

Slidably mounted in the bore of the sleeve 104 is a piston-like member 112 having a bore which is reduced at its lower end to receive the shank portion of a slitting tool or knife blade 113. As is best seen in Fig. 16, the lower end of this slitting tool 113 normally is slidably disposed in a bore 114 of the plug 105. The upper end of the slitting tool 113 terminates in a head portion or enlarged flange against which the balled or enlarged end of a thrust link 115 is maintained by a hollow retaining nut 116 screwed into the tapped upper end of the bore of the member 112. The upper end of the thrust link 115 is rotatably secured in any suitable manner to the inner end of an actuating lever 117 extending through a suitable slot in the sleeve 104. The outer end of this lever 117 is rotatably supported by a pair of vertical posts 118 (Figs. 11 and 13), and this lever has a bracket 119 upstanding therefrom intermediate its ends, upon the upper end of which a cam follower or roller 121 is rotatably mounted. Below the bracket 119, the actuating lever 117 is provided with a depending spring guide 122 engaging within the upper end of a coil spring 123, which is supported at its lower end by a block 124 mounted in any suitable manner on a horizontal frame member 125 secured to the stationary plate 97 and the post 118. The roller 121 engages the edge of a cam disk 126 which is secured to a horizontally disposed shaft 127 rotatably supported in any desired manner in parallel relationship to the shaft 111. Suitable means are provided for cyclically actuating the shafts 111 and 127, illustrated in broken lines in Fig. 13 and indicated by reference numeral 128, adapted to impart one complete revolution in a clockwise direction to the cams 109 and 126 in unison between each step-by-step movement imparted to the rotatable table 71 by the pusher pawl 82.

These several parts of the valve slitting and inserting mechanism 74 normally are disposed in their positions of Fig. 16, wherein the spring 106 maintains the valve-inserting plug 105 and sleeve 104 in its uppermost position, and the spring 123 acting against the lever 117 maintains the slitting tool 113 in its uppermost or fully retracted position. In this normal position of rest of these parts, the rollers 108 and 121 (Fig. 13) respectively engage the rest portions 109a and 126a of the cam disks 109 and 126. After the first quarter of each cyclic rotation of these cam disks, they assume the positions illustrated in Fig. 13, wherein their respective edge portions 109b and 126b are engaged by the followers 108 and 121. It will be understood that a valve-retaining mechanism 72 has previously been moved into vertical alignment with this mechanism 74 and with a valve 29 and closure member 25 mounted therein prior to such rotation of the cams 109 and 126. Consequently, the first quarter revolution of these cams will move the plug 105 downwardly from its position of Fig. 16 to its position of Fig. 13 which slightly compresses the rubber valve 29 to ensure proper position thereof in the aperture formed by the recesses 95 in the jaw members 84. At the same time, the slitting tool 113 also has been moved downwardly against the action of the spring 123 by the cam 126 to its position of Fig. 13, wherein the lower end thereof is disposed adjacent the lower end of the plug 105. During the subsequent quarter revolution of these cams, cam 109 and spring 106 retain the plug 105 in the position of Figs. 13 and 14, since that portion of this cam between its points 109b and 109c has a constant radius. However, the corresponding portion of the cam 126 between its points 126b and 126c comprises a bulge having sharply increasing and following decreasing radius, whereby such second quarter revolution of the cams will cause a quick depressing of the slitting tool 113 from its position of Fig. 13 to its position of Fig. 14 to completely pierce the rubber valve 29, followed by return thereof to its position of Figs. 13 and 15 by the spring 123. The third quarter of the cam 126 has a substantially constant radius from its point 126c to its point 126d of Fig. 13, while the corresponding portion of the cam 109 extending from its point 109c to its point 109d has a gradually increasing radius which results in depression of the plug 105 from its position of Fig. 14 to that illustrated in Fig. 15. This downward movement of the plug 105 results in extrusion of the previously slit rubber valve 29 through the small aperture in the retaining mechanism 72, defined by the shoulders 96, to insert this valve in the aperture of the closure member 25 supported thereinbelow by the anvil 92. The decreasing radii of the cams 109 and 126 between their points 109d and 109a, and 126d and 126a results in these several moving parts being returned by the springs 106 and 123 to their normal positions of rest illustrated in Fig. 16 during the final quarter of rotation of the shafts 111 and 127.

Thus, as each valve-retaining mechanism 72 is moved by rotation of the table 71 to a position of rest in the fifth or operating station below the slitting and inserting mechanism 74, the latter has one complete cycle of operations imparted thereto by a single rotation being given simultaneously to each of the shafts 111 and 127 by the actuating means 128. It will be understood that this latter actuating means is adapted to be cyclically operated in any suitable manner in proper timed relation relative to the pusher pawl 82 and simultaneously with the feeding action of the two hopper-type loading mechanisms 98 disposed, respectively, at the first and third operating positions of the table 71. During each such cyclic actuation of the slitting and inserting mechanism 74, the inserting plug 105 first is depressed from its clearing and normal position of Fig. 16 to that illustrated in Figs. 13 and 14 to ensure positive retention of the rubber valve 29 positioned at the operating stage. Such slight downward movement of the plug 105 is accompanied by an ineffective downward movement of the slitting tool 113 from its position of Fig. 16 to that illustrated in Fig. 13. This depression of the tool 113 continues in uninterrupted manner, while the plug 105 remains stationary in its retaining position of Figs. 13 and 14, to cause the lower cutting tip thereof to be passed downwardly completely through the valve 29 to its position of Fig. 14. Such slitting of the valve does not result in the removal of any of the rubber thereof, so that such forming of the slit 36 will permit the member 29 to function subsequently as a valve without requiring any compressive retaining means, as previously described herein. Since this slitting action of the tool 113 comprises an extremely rapid operation, the shoulders 96 of the jaw members 84 are effective to prevent any downward displacement of the valve during this slitting operation. Continued rotation of the cams 109 and 126 results in upward retraction of the slitting tool 113 and downward movement of the plug 105 to their positions of Fig. 15. Such downward movement of plug 105 forces the slit valve 29 through the aperture defined by the shoulders 96 and into its position of Fig. 15. As previously mentioned, this restricted aperture is of lesser diameter than that of the aperture 26 in the closure member 25 and, because the upper surfaces of the cutaway portions 94 are disposed relatively close to the closure member 25 mounted on the anvil 92 and such forcing of the valve 29 from the jaw members 84 is accomplished very rapidly, the valve will be substantially elongated in such ejecting operation to move the smaller end portion thereof completely through the aperture in the closure member 25 without imparting any strain against the closure member. These shoulders 96 thus perform the additional function of relieving the closure member 25 of any strain during insertion of the valve 29 therein. Upon subsequent lifting of the plug 105 and slitting tool 113 from their positions of Fig. 15 to those illustrated in Fig. 16 by the springs 106 and 123, the normally larger end portion of the valve 29 has a part thereof maintained under compression in the retaining mechanism 72, as illustrated in Fig. 15. However, the valve 29 will automatically assume its final position of Fig. 16 in the closure member 25 upon spreading apart of the jaw members 84 by their springs 91 as this retaining mechanism 72 is moved towards its seventh position, as illustrated at the left-hand side of Fig. 11.

When each retaining mechanism 72 is moved to this seventh stage, suitable unloading mechanism, indicated generally by reference numeral 129, becomes effective to automatically remove the completed valve-containing closure member from the machine. This unloading mechanism comprises a vertically disposed lifting rod 131 normally positioned below the rotatable table 71 and operable during each pause in the incremental rotations of the table to be moved upwardly through the anvil 92 then aligned therewith. Such raising of the rod 131, which may be accomplished pneumatically by air pressure obtained at the exhaust of the piston-like structure 101, 104, 112, lifts the valve-containing member 25 from the anvil 92. The leading edge of such valve-containing closure member (the top edge viewing Fig. 11) is thus raised into contact with with the inner end of a conveyor 132 which is disposed above the stationary plate 97. It will be understood that this inner end of the conveyor 132 overlies a suitable aperture 99 in the plate 97 to provide an exit for the closure member. Continued raising of the rod 131 thus causes this closure member to be tilted about this inner edge of the conveyor and forced to fall onto the latter. The conveyor 132 preferably is in the form of a plurality of freely rotatable rollers suitably spaced from each other and horizontally disposed in successively decreasing heights outwardly of the table 71 and cover plate 97. A bin 133 is disposed adjacent the outer end of the conveyor 132 to receive the completed valve-containing closure members 25 thus delivered thereto.

It will be noted that the method of slitting the valve members 29 and mounting the same in the closure member 25, as thus effected automatically by the machine 69 above described, differs from that resulting from the use of the manual slitting and inserting tool 55. The latter is adapted first to insert a valve in a closure member and then slit the same, whereas the machine 69 effects slitting of the valve prior to its insertion or mounting in a closure member. The present invention, however, in its broader aspects, includes these optional reversals of the slitting and inserting steps, although it is preferred that the slitting of the valves be accomplished before the insertion or mounting thereof in the closure members. In fact, so far as the article of manufacture comprising the closure member 25 is concerned, the slit 36 in the valve 29 may be performed during the molding of the valve, if desired, in a manner similar to the previously described method of forming the tool-grinding aperture 35. It will be appreciated that the machine 69 illustrated in Figs. 11 to 16 may employ only four stations of operation, since only the first, third, fifth and seventh stations for the retaining mechanisms 72 illustrated are active in character. On the other hand, any other number of retaining mechanisms 72 greater or less than the eight herein shown also may be employed, if desired.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment of the invention.

I claim:

1. A device for slitting a rubber valve axially and inserting the same longitudinally in an aperture in a closure of smaller cross-sectional area than said valve, comprising valve stretching means, including a member movable longitudinally relative to said closure to force a portion of said valve through said aperture, and blade guiding means; and a blade slidably mounted in said blade guiding means and movable longitudinally relative thereto to slit said valve axially thereof.

2. A device for slitting a rubber valve and inserting the same in a flanged aperture in a closure member, comprising a member for engaging an end of the valve, means connected to said engaging member for applying pressure to the valve in an axial direction to force a portion thereof through the aperture in said closure member, a slitting knife mounted interiorly of said engaging member, and means for moving said knife relative to said engaging member and projecting the same therebeyond and through said valve axially thereof.

3. A device for slitting and inserting a rubber valve in an apertured closure member, comprising rotatable supporting means, a plurality of valve receiving and retaining mechanisms mounted on said supporting means, means for imparting step-by-step increments of rotation to said supporting means to move said mechanisms successively to different operating stations, means for automatically delivering a closure member and a valve to each of said mechanisms at certain said stations, cyclically operable means for slitting each valve longitudinally after movement thereof by a said retaining mechanism to a subsequent said station, cyclically operable means for forcing each said valve into the aperture of the associated closure member, and cyclically operable means mounted at a subsequent said station for automatically removing the resulting assembled valves and closure members from said retaining mechanisms.

4. A device for slitting and inserting a rubber valve in an apertured closure member, comprising rotatable supporting means, a plurality of valve receiving and retaining mechanisms mounted on said supporting means for movement relative thereto, means for automatically moving said mechanisms to open position, means for imparting step-by-step increments of rotation to said supporting means to move said mechanisms successively to different operating stations, stationary means engaging said mechanisms for moving the same to closed position against the action of said opening means between certain of said stations, means for automatically delivering a closure member and a valve to each of said mechanisms at certain said stations, cyclically operable means for slitting each valve longitudinally after movement thereof by a said retaining mechanism to a subsequent said station, cyclically operable means for forcing each said valve into the aperture of the associated closure member, and cyclically operable means mounted at a subsequent said station for automatically removing the resulting assembled valves and closure members from said retaining mechanisms.

5. A device for slitting a rubber valve and inserting the same in an apertured closure member, comprising a rotatable table, a plurality of valve receiving and retaining mechanisms slidably mounted on said table for movement relative thereto, a first means for automatically moving said mechanisms to valve-receiving position, means for imparting step-by-step increments of rotation to said table to move said mechanisms successively to different operating stations, stationary means engaging said mechanisms for moving the same to valve-retaining position against the action of said first means between certain of said stations, means for automatically delivering a closure member to each of said mechanisms as the latter are moved to a first said station, means for automatically delivering a rubber valve to each said mechanism when the latter is moved to a subsequent said station, cyclically operable valve slitting and inserting mechanism mounted at a different subsequent said station for slitting the rubber valve in each retaining mechanism moved into registry therewith and forcing said slit valve into the aperture of the associated closure member, and cyclically operable means mounted at a subsequent said station for automatically removing the resulting assembled valves and closure members from said retaining mechanisms.

6. In a device of the class described, a rotatable table, a plurality of retaining mechanisms mounted in circumferentially spaced relationship on said table and each comprising a pair of opposed jaw members slidable relative to each other and to the table, spring means for urging said jaw members apart, stationary cam members directly engaging said jaw members to limit movement thereof by said spring means to three different positions, and means for rotating said table to cause said jaw members to be moved toward each other against the action of said spring means in different degrees by said cam members as said retaining mechanisms are rotated with said table to different positions.

7. In a device of the class described, means for receiving and retaining an apertured closure member and a rubber valve in spaced relationship to each other with the valve disposed in axial alignment with the aperture in the closure member, and valve slitting and inserting mechanism, comprising an apertured plug mounted for sliding movement relative to said retaining means in axial alignment with the valve therein, a slitting knife mounted for axial movement relative to and through said apertured plug, and actuating mechanism cyclically operable to move said plug into restraining engagement with a valve in said retaining means, to project said knife through said plug and said valve and retract the same relative thereto, and to move said plug against the valve to force the same into the aperture of said closure member.

References Cited in the file of this patent

UNITED STATES PATENTS

| | | |
|---|---|---|
| 107,582 | Wolff et al. | Sept. 20, 1870 |
| 1,693,069 | Cramer | Nov. 27, 1928 |
| 1,859,231 | Canfield | May 17, 1932 |
| 2,132,788 | Hunt | Oct. 11, 1938 |
| 2,217,335 | Eden | Oct. 8, 1940 |
| 2,339,792 | Milano | Jan. 25, 1944 |
| 2,492,227 | Koreckey | Dec. 27, 1949 |
| 2,537,089 | Rempel | Jan. 9, 1951 |
| 2,551,652 | Vreeland | May 8, 1951 |
| 2,552,784 | Hartin | May 15, 1951 |
| 2,556,237 | Teichmann | June 12, 1951 |
| 2,564,624 | Hoos | Aug. 14, 1951 |

FOREIGN PATENTS

| | | |
|---|---|---|
| 58,767 | Germany | Sept. 14, 1891 |
| 180,503 | Germany | Jan. 17, 1907 |
| 499,647 | France | Feb. 17, 1920 |